United States Patent
Spilchuk

(10) Patent No.: US 12,319,439 B2
(45) Date of Patent: Jun. 3, 2025

(54) METHOD AND APPARATUS FOR COVERING AN AIRCRAFT ENGINE

(71) Applicant: AVISHIELD SYSTEMS LTD., Kelowna (CA)

(72) Inventor: Jamie Daniel Spilchuk, West Kelowna (CA)

(*) Notice: Subject to any disclaimer, the term of this patent is extended or adjusted under 35 U.S.C. 154(b) by 28 days.

(21) Appl. No.: 18/510,384

(22) Filed: Nov. 15, 2023

(65) Prior Publication Data

US 2024/0199227 A1 Jun. 20, 2024

Related U.S. Application Data

(60) Provisional application No. 63/432,659, filed on Dec. 14, 2022.

(51) Int. Cl.
*B64F 1/00* (2024.01)

(52) U.S. Cl.
CPC .................................. *B64F 1/005* (2013.01)

(58) Field of Classification Search
CPC .......................... B64F 1/005; B64D 2033/022
See application file for complete search history.

(56) References Cited

U.S. PATENT DOCUMENTS

| | | | | |
|---|---|---|---|---|
| 5,114,098 A | * | 5/1992 | Campbell | B64F 1/005 D12/345 |
| 5,143,321 A | * | 9/1992 | Jackson | B64F 1/005 60/39.092 |
| 5,899,217 A | * | 5/1999 | Testman, Jr. | B08B 17/00 134/201 |
| 9,206,703 B2 | * | 12/2015 | Tadayon | F01D 25/002 |
| 9,446,857 B2 | * | 9/2016 | Sparks | B64F 1/005 |
| 2008/0073008 A1 | * | 3/2008 | Allen | B64F 1/005 150/157 |
| 2024/0190583 A1 | * | 6/2024 | Labas | B64F 1/005 |

\* cited by examiner

*Primary Examiner* — Brian M O'Hara

(57) ABSTRACT

An apparatus, system and method for covering an aircraft engine. The apparatus comprises front and rear spaced apart plates with an edge engaging portion therebetween and a connector for securing the apparatus to a body to be applied to the aircraft engine shroud. The system comprises a front cover sized to surround a front portion of the aircraft engine, at least one apparatus for covering an aircraft engine at least one hook comprising the apparatus adapted to engage a trailing edge of the shroud of the aircraft engine and a strap operably connected to each at least one hook and extending to the front cover. The method comprises locating the front cover over the front portion of the engine, securing at least one hook to trailing edge of the engine shroud and tightening a strap operably connected to the at least one hook and the front cover.

18 Claims, 7 Drawing Sheets

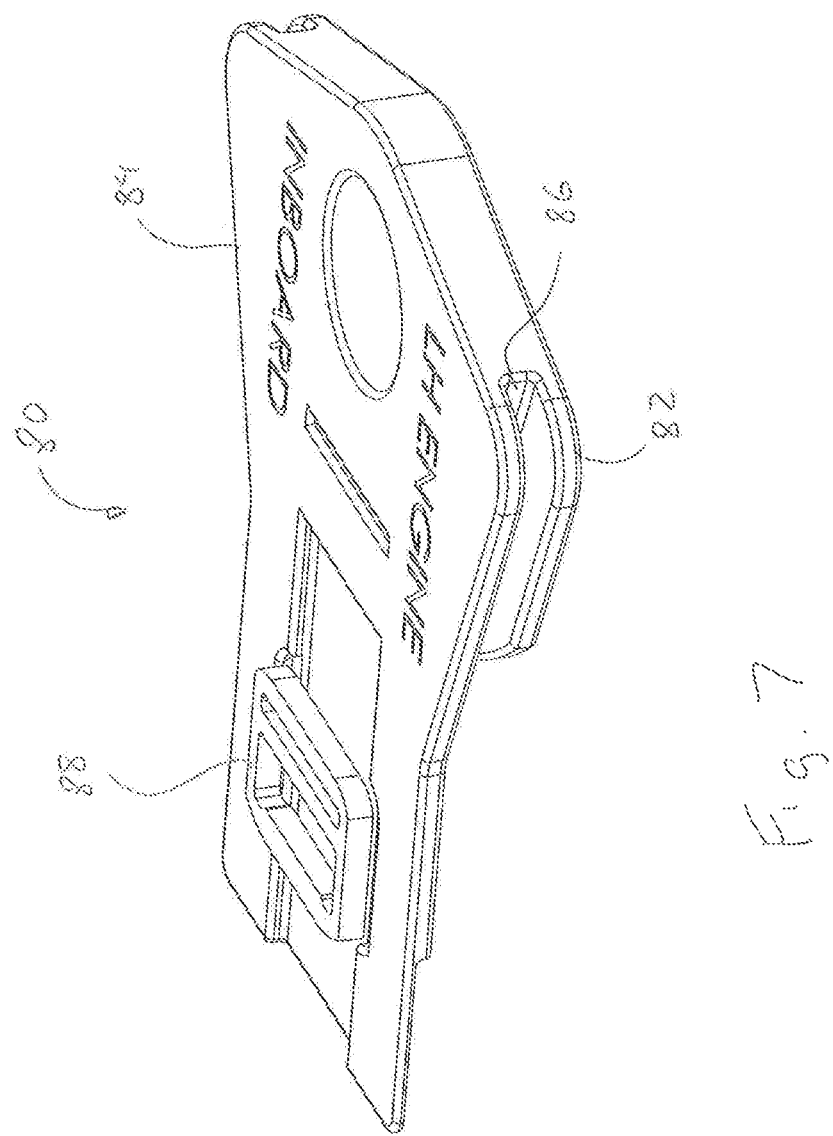

METHOD AND APPARATUS FOR COVERING AN AIRCRAFT ENGINE

BACKGROUND

1. Technical Field

This disclosure relates generally to airplanes and in particular to a method and apparatus for covering the engine of an aircraft.

2. Description of Related Art

Aircraft engine are frequently required to be covered to protect them from elements including snow and rain. In particular, it is desired to cover the inlet and/or outlet of the aircraft engine to prevent the intrusion of water and other contaminants thereto. Conventionally, such openings are commonly covered with bodies formed to a shape corresponding to the inlet or outlet to provide a plug or block. Such bodies are commonly formed of foam or the like. Disadvantageously, such foam blocks may be large and bulky to store as it will be appreciated that such blocks are not collapsible and most aircraft require 2 or 4 sets of such blocks for the entire aircraft.

Additionally, such blocks may be difficult to install as they may require 2 or more workers to install whereby one worker locates the block and holds it in place while others secure straps or other securing means to retain the block in place. Such blocks may also not completely prevent water and other debris from entering the aircraft engine due to imperfect fit between the block and the inlet or outlet as well as not completely preventing water, snow or other debris from accumulating at the location of the inlet or outlet.

SUMMARY OF THE DISCLOSURE

According to a first embodiment, there is disclosed an apparatus for securing a cover to an aircraft engine shroud comprising front and rear spaced apart plates with an edge engaging portion therebetween and a connector for securing the apparatus to a body to be applied to the aircraft engine shroud.

The front and rear plates may be substantially parallel to each other. The front and rear plates may be spaced apart by a gap distance corresponding to a thickness of the aircraft engine shroud. The gap distance may be selected to be between ⅛ and 1 inch.

The edge engaging portion may have a profile along a plane parallel to the front and rear plates corresponding to a portion of the trailing edge of the aircraft engine shroud. The profile may comprise an arcuate shape. The profile may have a wall surface perpendicularly extending between the front and rear plates.

The profile may have a wall surface extending arcuately between the front and rear plates. The profile may have a substantially triangular shape with an arcuate leading portion corresponding to at least one concave portion of the serrated trailing edge of an aircraft engine shroud. The connector may comprise a slot adapted to receive a strap therethrough.

According to a further embodiment, there is disclosed a system for covering an aircraft engine comprising a front cover sized to surround a front portion of the aircraft engine, at least one hook comprising an apparatus for securing a cover to an aircraft engine shroud comprising front and rear spaced apart plates with an edge engaging portion therebetween and a connector for securing the apparatus to a body to be applied to the aircraft engine shroud adapted to engage a trailing edge of the shroud of the aircraft engine and a strap operably connected to each at least one hook and extending to the front cover.

The system may further comprise a rear cover sized to surround a rear portion of the aircraft engine, the rear cover including straps extending to and connectable to the front cover. The rear cover may further include at least one hook. The at least one hook may be secured to an inner surface of the rear cover. The rear plate of the at least one hooks may be sewn to the inner surface of the rear cover. The rear plates may include a thinned edge through which stitching may be passed to secure the rear plate to the rear cover.

According to a further embodiment, there is disclosed a method for covering an aircraft engine comprising providing a front cover sized to surround a front portion of the engine, locating the front cover over the front portion of the aircraft engine, securing at least one hook to trailing edge of the engine shroud and tightening a strap operably connected to the at least one hook and the front cover.

The method may further comprise locating a rear cover over a rear portion of the aircraft engine, extending a strap from the rear cover to the front cover and tightening the strap. The method may further comprise locating at least one hook on an inner surface of the rear cover around the trailing edge of a shroud around the aircraft engine.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrates exemplary aspects wherein similar characters of reference denote corresponding parts in each view.

FIG. 7 is a cross sectional view of one of the hooks of FIG. 3 as taken along the line 7-7.

DETAILED DESCRIPTION

Figure 1:
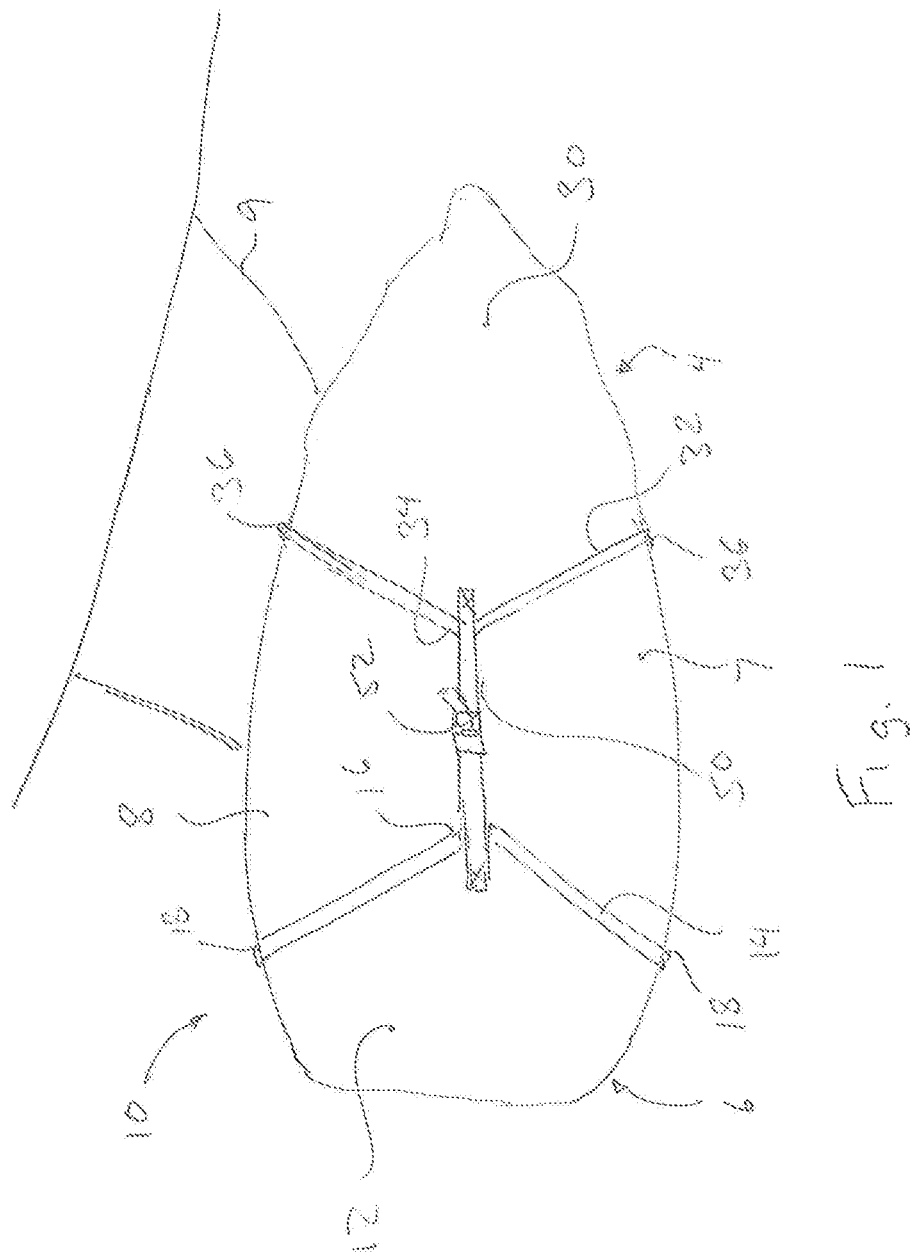
FIG. 1 is a perspective view of an aircraft engine with a cover according to a first embodiment of the present disclosure secured thereover.

Aspects of the present disclosure are now described with reference to exemplary apparatuses, methods and systems. Referring to FIG. 1, an exemplary apparatus for covering an aircraft engine according to a first embodiment is shown generally at 10 as applied to an aircraft engine 8. In particular, the apparatus 10 comprises a front cover 12 sized to surround a front portion of the aircraft engine 8, an optional rear cover 30 having at least one hook apparatus 60 therein engagable upon a rear edge of the aircraft engine shroud and at least one strap or other body extending between the front and rear covers.

The front cover 12 comprises a body formed of a fabric having a shape corresponding to the front portion 6 of the aircraft engine 8 around which the apparatus is sized. It will be appreciated that the size and shape of the front cover will be adapted to correspond to the aircraft for which the apparatus is intended. In particular the front cover 12 may have a cup or concave shape adapted cover the inlet of the aircraft engine and a portion of the shroud 7. As illustrated, the front cover 12 extends to a rear edge 14 which may be reinforced by additional fabric such as through doubling over the fabric as is commonly known. Furthermore, the rear edge 14 may angled to a rearmost edge 16 proximate to a connection point for the straps 50, such as by way of non-limiting example at each side of the aircraft engine from a front most edge portion 18 such as by way of non-limiting example at the top and bottom of the aircraft engine. As illustrated, the front cover may closely surround the front portion 6 of the aircraft engine although it will be appreciated from the entire disclosure that varying degrees of how close a fit thereto may be adjusted. Although two or more straps 50 may be utilized with each front cover, only one is shown in FIG. 1 for ease of illustration.

Figure 2:
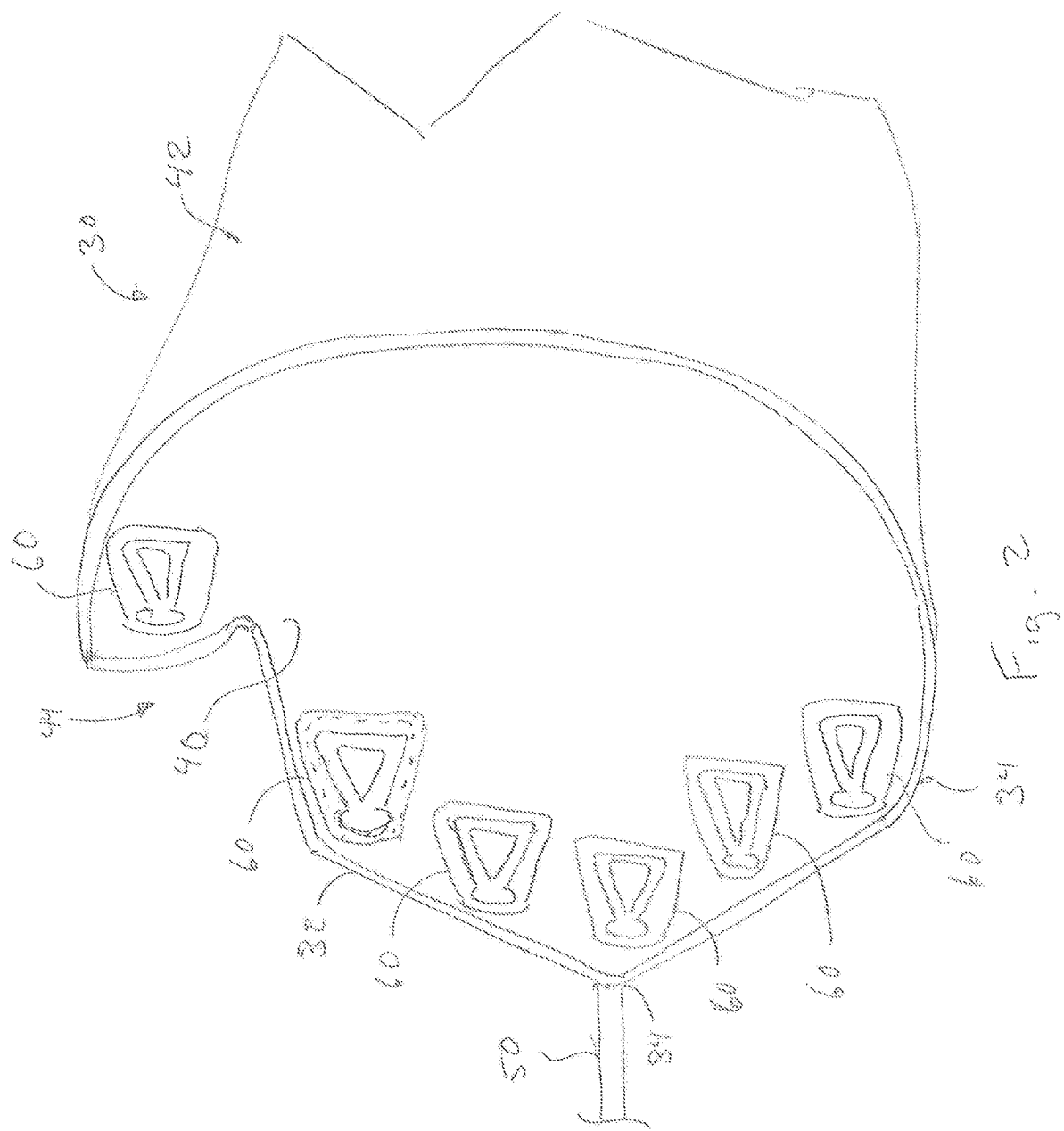
FIG. 2 is a perspective view of an aircraft engine with the front cover secured thereover
Figure 3:
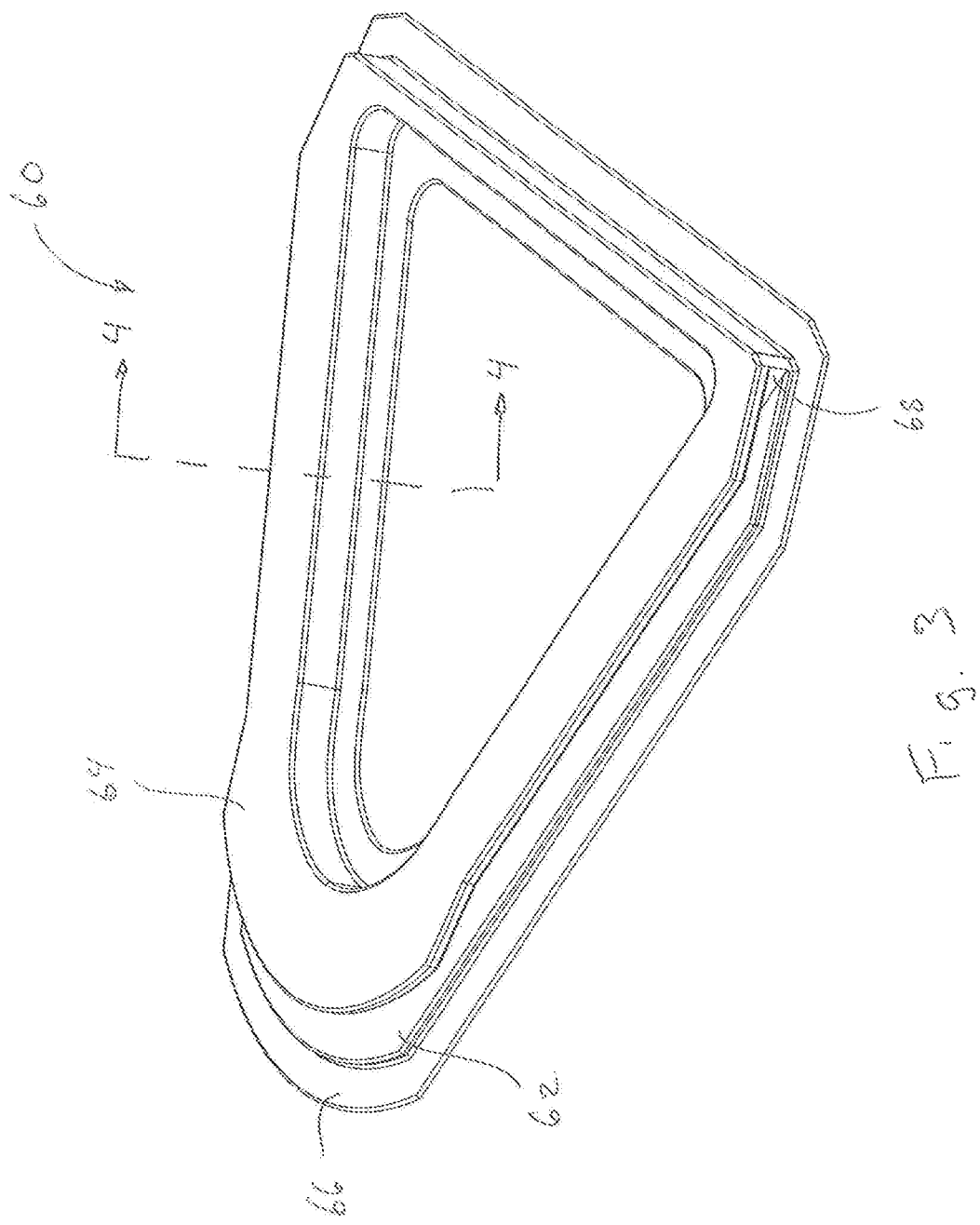
FIG. 3 is a perspective view of the hook of the cover of FIG. 2.

Turning now to FIG. 2, the front cover 12 may be installed over the front portion 6 of the aircraft engine with hooks 80 engaged on a trailing edge of the shroud 7. Straps 90 extend from the hooks 80 to the front cover 12 and include buckles 92 so as to be tightenable securing the front cover over the front portion 6 of the aircraft engine. As illustrated in FIG. 3, each hook body 80 comprises rear and front plates, 82 and 84, respectively with an edge engaging portion 86 therebetween. The arrangement of the front and rear plates and edge engaging portion may be substantially similar to as set out below with respect to the rear cover hook bodies 6 however, the front plate 84 may also include a connector 88, such as, by way of non limiting example a slot or aperture for passing the strap 50 through and tightening against. With reference to FIG. 2, according to some embodiment, the rear cover 30 may be omitted.

The rear cover 30 comprises a body formed of a fabric having a shape corresponding to the rear portion 4 of the aircraft engine 8 around which the apparatus is sized. It will be appreciated that the size and shape of the front cover will be adapted to correspond to the aircraft for which the apparatus is intended. In particular the rear cover 30 may have a cup or concave shape adapted cover the outlet or exhaust of the aircraft engine and a portion of the shroud 7. As illustrated, the rear cover 30 extends to a front edge 32 which may be reinforced by additional fabric such as through doubling over the fabric as is commonly known. Furthermore, the front edge 32 may angled to a frontmost edge 34 proximate to a connection point for the straps 50, such as by way of non-limiting example at each side of the aircraft engine from a rear most edge portion 36 such as by way of non-limiting example at the top and bottom of the aircraft engine. As illustrated, the front cover may closely surround the rear portion 6 of the aircraft engine although it will be appreciated from the entire disclosure that varying degrees of how close a fit thereto may be adjusted. Although two or more straps 50 may be utilized with each rear cover, only one is shown in FIG. 1 for ease of illustration.

The front and rear covers 12 and 30 may be formed of any suitable fabric, including, without limitation, canvas, rubberized fabrics insulated fabrics or multiple layers thereof. It will be appreciated that for uses in which the aircraft engine is desired to be stored for longer periods of time, greater degrees of waterproofing may be desired in the fabric so as to prevent the entrance of moisture into the engine. Furthermore, desiccants or other moisture absorbing substances may be included within the engine for such storage needs.

The rear cover strap straps 50 extend between the front and rear covers 12 and 30. The straps may include buckle 52 or the like therein for drawing the front and rear covers 12 and 30 together around the engine. It will be observed that tightening of the strap 50 will draw the frontmost portion 18 of the edge of the front cover and the rear most portion closer towards the shroud 7 thereby improving the seal of the rear edge 14 and front edge 32 therearound. The strap 50 may be secured to the front and rear covers 12 and 30 by any known means, including, by way of non-limiting example sewing, adhesives, fasteners or the like.

Figure 4:
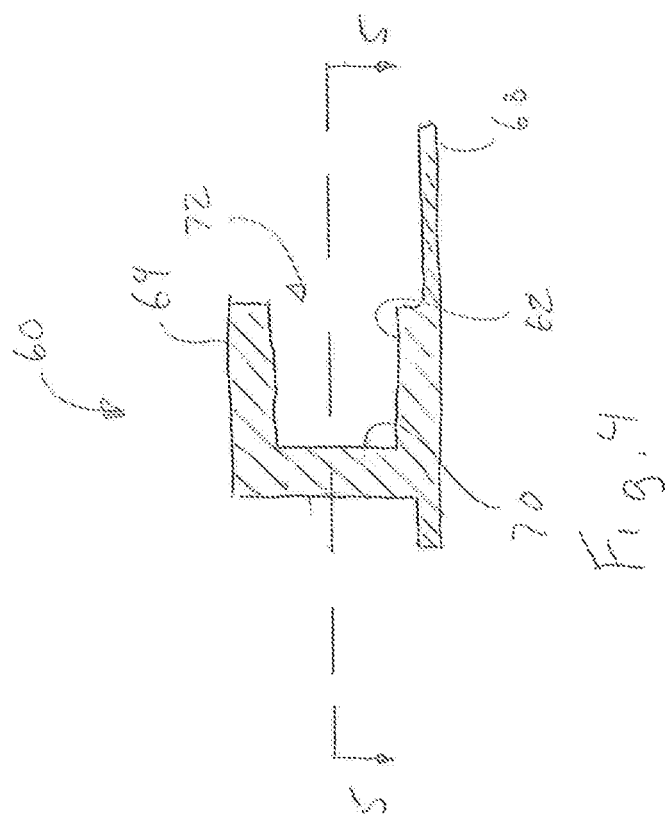
FIG. 4 is a perspective view of the interior of the rear cover of FIG. 1.

Turning now to FIG. 4, a perspective view of the rear cover 30 is illustrated. The rear cover 30 includes inner and outer surfaces 40 and 42, respectively, wherein the inner surface 40 includes at least one hook apparatus for connecting to the engine shroud. As illustrated in FIG. 4, the hook apparatus 60 comprises a body adapted to engage a rear edge of the aircraft engine shroud 7 so as to retain the rear cover 30 at a desired position therearound. As illustrated in FIG. 4, the rear cover 30 may include a plurality of hook bodies distributed annularly therearound. As illustrated in FIG. 4, the rear cover 30 may also include a notch 44 in the front edge 32 at a position corresponding to the pylon (as illustrated in FIG. 1) for supporting the aircraft engine from the wing of the aircraft.

Figure 5:
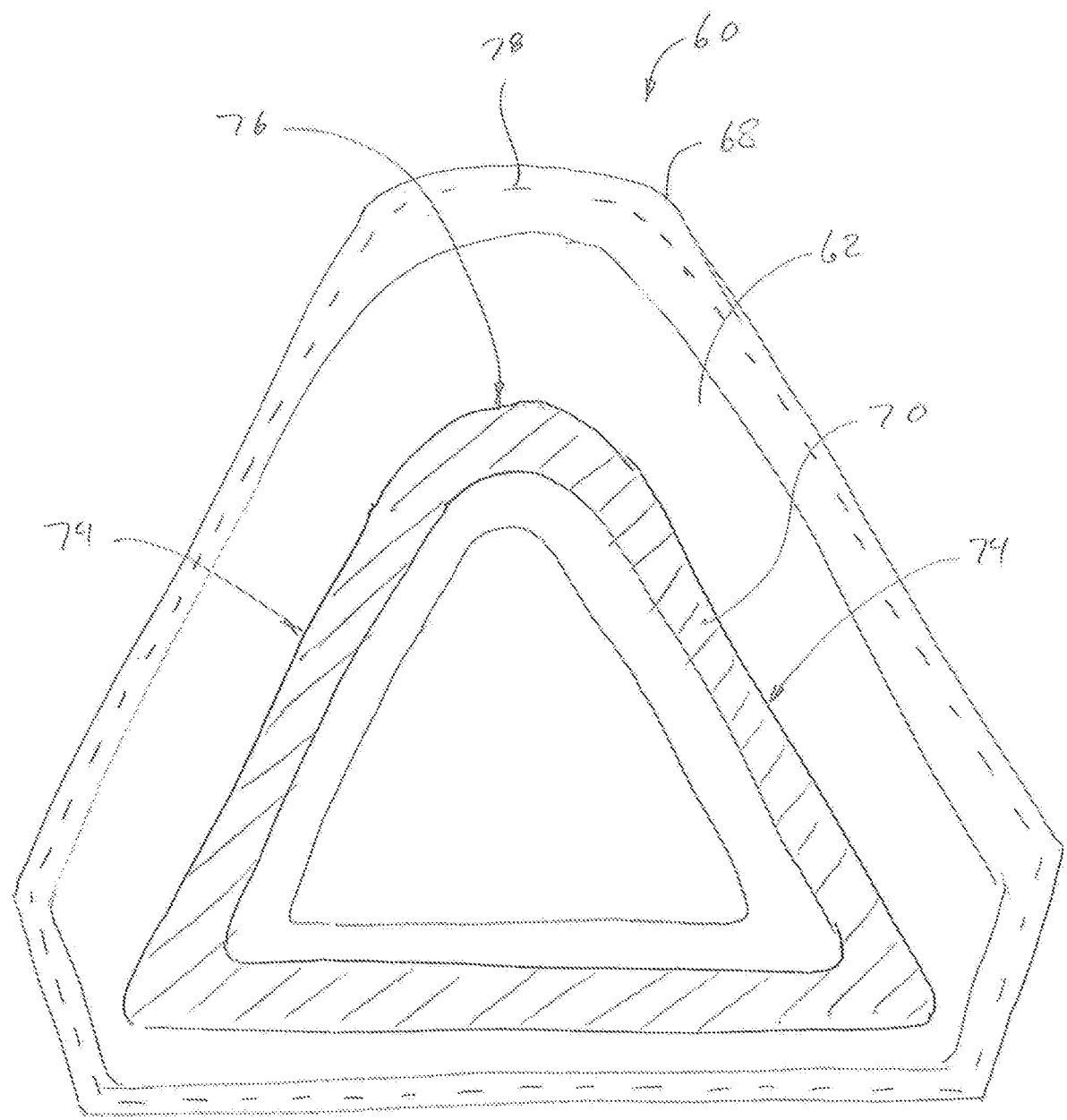
FIG. 5 is a detailed perspective view of one of the hooks of the rear cover of FIG. 1.
Figure 6:
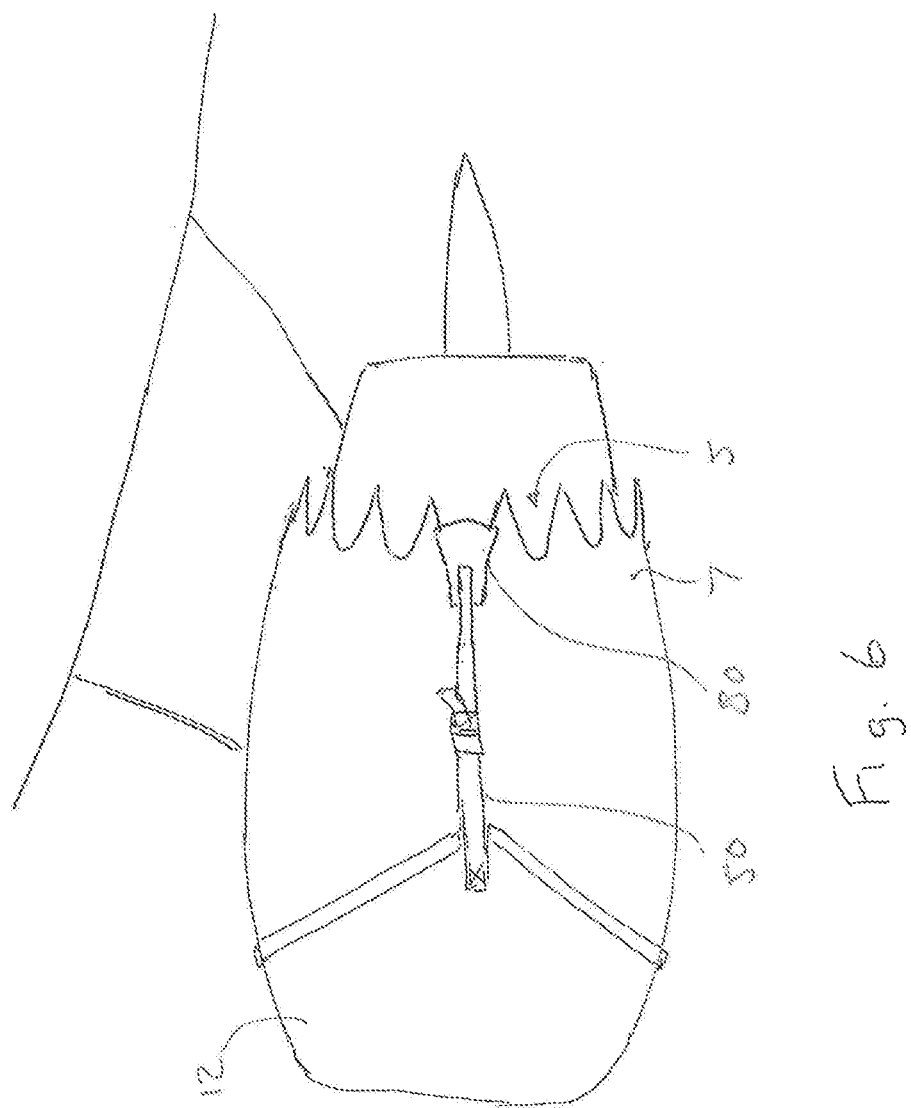
FIG. 6 is a cross sectional view of one of the hooks of FIG. 3 as taken along the line 6-6.

Turning now to FIGS. 5 through 7, each hook apparatus 60 comprises rear and front plates, 62 and 64, respectively with an edge engaging portion 68 therebetween. The front and rear plates 64 and 62 may be substantially planar members spaced apart from each other by a gap distance, generally indicated at 72 in FIG. 6. The gap distance 72 may be selected to correspond to the thickness of the aircraft engine shroud 7 such that the rear edge of the shroud 7 is received therein against the edge engaging portion 70. By way of non-limiting example the gap distance 72 may be selected to be between ⅛ and 1 inch (3 and 25 mm) although it will be appreciated that other distances may be useful as well. As illustrated in FIG. 6, the edge engaging portion 70 may have a wall that is substantially perpendicular to the front and rear plates 64 and 62 although it will be appreciated that other profiles such as, by way of non-limiting example, concave may also be utilized so as to correspond to the edge profile of the shroud 7.

As illustrated in FIG. 7, the edge engaging profile 70 may be formed with a shape along a plane parallel to the front and rear plates 64 and 62 corresponding to a rear profile of the shroud. In particular, as illustrated in FIG. 5, the edge engaging profile 70 may have a shape corresponding to a serration as are commonly found along the rear edge of the shroud of the engine on a Boeing® 737-Max or Boeing® 787 aircraft which is also illustrated for reference in FIG. 6 as denoted by reference character 5. In particular, the edge engaging profile may include a pair of angled side portion 74 with a leading arcuate portion 76 therebetween. The angle of the side portions and the radius of the arcuate portion may be selected to correspond to the shape of the serration 5.

The rear hook apparatus body 60 may be secured to the rear cover 30 by any known means, including, without limitation, sewing, adhesives, fasteners or the like. In particular, the rear plate 62 may include a connector, such as by way of non-limiting example, a thinner edge portion 68 through which stitching or the like may be passed along a stitch line generally indicated at 78 in FIG. 5. In operation, the front plate 64 secures and retains each edge engaging portion 70 in contact with the serration that the hook apparatus body 60 is intended to be located. As illustrated in FIG. 2, a plurality of hook bodies 60 may be secured to the inner surface 40 of rear cover 30. It will be appreciated that any number as is desired for retaining the rear cover in place may be utilized. In particular only a single hook body may be utilized proximate to each strap 50 or hook bodies may only be located proximate to the notch 44. In other embodiments, a plurality of hook apparatuses 60 may be arranged around the rear cover. Although the hook apparatus 60 are illustrated as being contacted to the rear cover in FIG. 2, it will be appreciated that the at least one hook apparatus 60 may also be connected to any other body around the outside of the engine shroud as well.

While specific embodiments have been described and illustrated, such embodiments should be considered illustrative only and not as limiting the disclosure as construed in accordance with the accompanying claims.

What is claimed is:

1. A system for covering an aircraft engine comprising:
   a front cover sized to surround a front portion of the aircraft engine;
   at least one hook, the hook comprising:
      front and rear plates arranged substantially parallel to each other, and
      an edge engaging portion between the plates; and
   a strap operably connected to each at least one hook and extending to the front cover;
   wherein the edge engaging portion is adapted to engage a trailing edge of a shroud of the aircraft engine.

2. The system of claim 1 wherein the hook comprises a slot for securing the strap.

3. The system of claim 1 wherein the front and rear plates are spaced apart by a gap distance corresponding to a thickness of the aircraft engine shroud.

4. The system of claim 3 wherein the gap distance is selected to be between ⅛ and 1 inch.

5. The system of claim 1 wherein the edge engaging portion has a profile along a plane parallel to the front and rear plates corresponding to a portion of the trailing edge of the aircraft engine shroud.

6. The system of claim 5 wherein the profile comprises an arcuate shape.

7. The system of claim 5 wherein the profile has a wall surface perpendicularly extending between the front and rear plates.

8. The system of claim 5 wherein the profile has a wall surface extending arcuately between the front and rear plates.

9. The system of claim 5 wherein the profile has a substantially triangular shape with an arcuate leading portion corresponding to at least one concave portion of the serrated trailing edge of an aircraft engine shroud.

10. The system of claim 1 wherein the connector comprises a slot adapted to receive a strap therethrough.

11. The system of claim 1 further comprising a rear cover sized to surround a rear portion of the aircraft engine, the rear cover including straps extending to and connectable to the front cover.

12. The system of claim 11 wherein the rear cover further includes at least one hook.

13. The system of claim 12 wherein the at least one hook is secured to an inner surface of the rear cover.

14. The system of claim 13 wherein the rear plate of the at least one hooks are sewn to the inner surface of the rear cover.

15. The system of claim 14 wherein the rear plates include a thinned edge through which stitching may be passed to secure the rear plate to the rear cover.

16. A method for covering an aircraft engine comprising:
   providing a front cover sized to surround a front portion of the engine;
   locating the front cover over the front portion of the aircraft engine;
   securing at least one hook to a trailing edge of the engine shroud, the hook comprising
      front and rear plates arranged substantially parallel to each other; and
      an edge engaging portion between the plates; and
   tightening a strap operably connected to the at least one hook and the front cover.

17. The method of claim 16 further comprising:
   locating a rear cover over a rear portion of the aircraft engine;
   extending at least one second strap from the rear cover to the front cover; and
   tightening the at least one second strap.

18. The method of claim 17 further comprising locating the at least one hook on an inner surface of the rear cover.

* * * * *